US009152012B2

(12) United States Patent
Yamaguchi

(10) Patent No.: US 9,152,012 B2
(45) Date of Patent: Oct. 6, 2015

(54) POWER SOURCE SWITCHING DEVICE AND ELECTRONIC APPLIANCE

(71) Applicant: Panasonic Corporation, Osaka (JP)

(72) Inventor: Shun Yamaguchi, Hyogo (JP)

(73) Assignee: Panosonic Intellectual Property Management Co., Ltd., Osaka (JP)

( * ) Notice: Subject to any disclaimer, the term of this patent is extended or adjusted under 35 U.S.C. 154(b) by 407 days.

(21) Appl. No.: 13/863,641

(22) Filed: Apr. 16, 2013

(65) Prior Publication Data

US 2013/0272691 A1    Oct. 17, 2013

(30) Foreign Application Priority Data

Apr. 17, 2012   (JP) ................................ 2012-093622

(51) Int. Cl.
*G03B 7/26* (2006.01)
*G05F 3/08* (2006.01)
*H02J 1/10* (2006.01)

(52) U.S. Cl.
CPC .. *G03B 7/26* (2013.01); *G05F 3/08* (2013.01); *H02J 1/108* (2013.01); *G03B 2217/007* (2013.01)

(58) Field of Classification Search
CPC ............... G03B 7/26; G05F 3/08; H02J 9/04; H02J 9/06
See application file for complete search history.

(56) References Cited

U.S. PATENT DOCUMENTS

| 5,784,626 A * | 7/1998 | Odaohara ..................... 713/300 |
| 8,941,264 B2 * | 1/2015 | Scruggs et al. ................. 307/52 |
| 2004/0155627 A1 * | 8/2004 | Stanesti et al. ................ 320/127 |
| 2012/0272691 A1 * | 11/2012 | Leibman et al. ............. 68/17 R |

FOREIGN PATENT DOCUMENTS

| JP | 2-311131 | 12/1990 |
| JP | 8-336243 | 12/1996 |
| JP | 2007-089350 | 4/2007 |
| JP | 2008-125199 | 5/2008 |

* cited by examiner

*Primary Examiner* — W B Perkey
(74) *Attorney, Agent, or Firm* — Panasonic Patent Center

(57) ABSTRACT

A power source switching device includes a first switch circuit provided between a first power source and a load section, a second switch circuit provided between a second power source and the load section, a third switch circuit provided between the first power source and the load section in series with the first switch circuit, a fourth switch circuit provided between the second power source and the load section in series with the second switch circuit, a logic circuit that controls the third and the fourth switch circuits to prevent at least one of the third and fourth switch circuits from turning on while both of the first and second switch circuits are in an on state, and a control circuit that controls the first switch circuit, the second switch circuit, and the logic circuit.

11 Claims, 6 Drawing Sheets

POWER SOURCE SWITCHING DEVICE AND ELECTRONIC APPLIANCE

BACKGROUND

1. Technical Field

The present disclosure relates to a power source switching device which performs switching control to switch among a plurality of batteries for use, and an electronic appliance provided with the power source switching device.

2. Related Art

Some conventional electronic appliances such as digital cameras have a plurality of batteries so that they can switch the batteries to use any one of the batteries.

For example, JP 2007-89350 A discloses a configuration having a main power source and a sub-power source. According to the configuration, when detecting malfunction of power supply state of the main power source, the power supply from the main power source is maintained for a predetermined time period and then the power supply from the main power source is cut off while starting power supply from the sub-power source.

A conventional electronic appliance having such a configuration might be in a malfunction state of having the plurality of batteries connected directly (shorted) in the case where a control unit (controller, microcomputer) for performing switching control of the power supply cannot perform a normal operation (in the case of runaway of a control unit) for some reason. As a result of such a case, a charging operation is performed by one of the batteries to the other of the batteries, which causes an adverse effect on the batteries and the electronic appliance body.

SUMMARY

An object of the present disclosure is to provide a power source switching device which keeps normal power supply even in the case where a control unit for performing switching control on the power supply is in a malfunction state.

A power source switching device according to the present disclosure is a device which switches between a first power source and a second power source for a power source for supplying a driving voltage to a load section. The power source switching device includes:

a first switch circuit that is provided between the first power source and the load section;

a second switch circuit that is provided between the second power source and the load section;

a third switch circuit that is provided between the first power source and the load section in series with the first switch circuit;

a fourth switch circuit that is provided between the second power source and the load section in series with the second switch circuit;

a first diode that is provided in parallel with the third switch circuit for allowing a current to flow from the first power source to the load section and while preventing a current from flowing from the second power source into the first power source;

a second diode that is provided in parallel with the fourth switch circuit for allowing a current to flow from the second power source to the load section while preventing a current from flowing from the first power source into the second power source;

a logic circuit that controls the third switch circuit and the fourth switch circuit to prevent at least one of the third switch circuit and the fourth switch circuit from turning on while both of the first switch circuit and the second switch circuit are in an on state; and a control circuit that controls the first switch circuit, the second switch circuit, and the logic circuit.

According to the present disclosure, even in the case where a control unit for performing switching control on the power supply is in an extraordinary state and sends a control signal which would not be used under constraints of design, the power source switching device can prevent the batteries from being connected (short-circuited) with each other by means of hardware. Thus it can provide a power source switching device which keeps normal power supply.

DETAILED DESCRIPTION OF PREFERRED EMBODIMENTS

Figure 1:
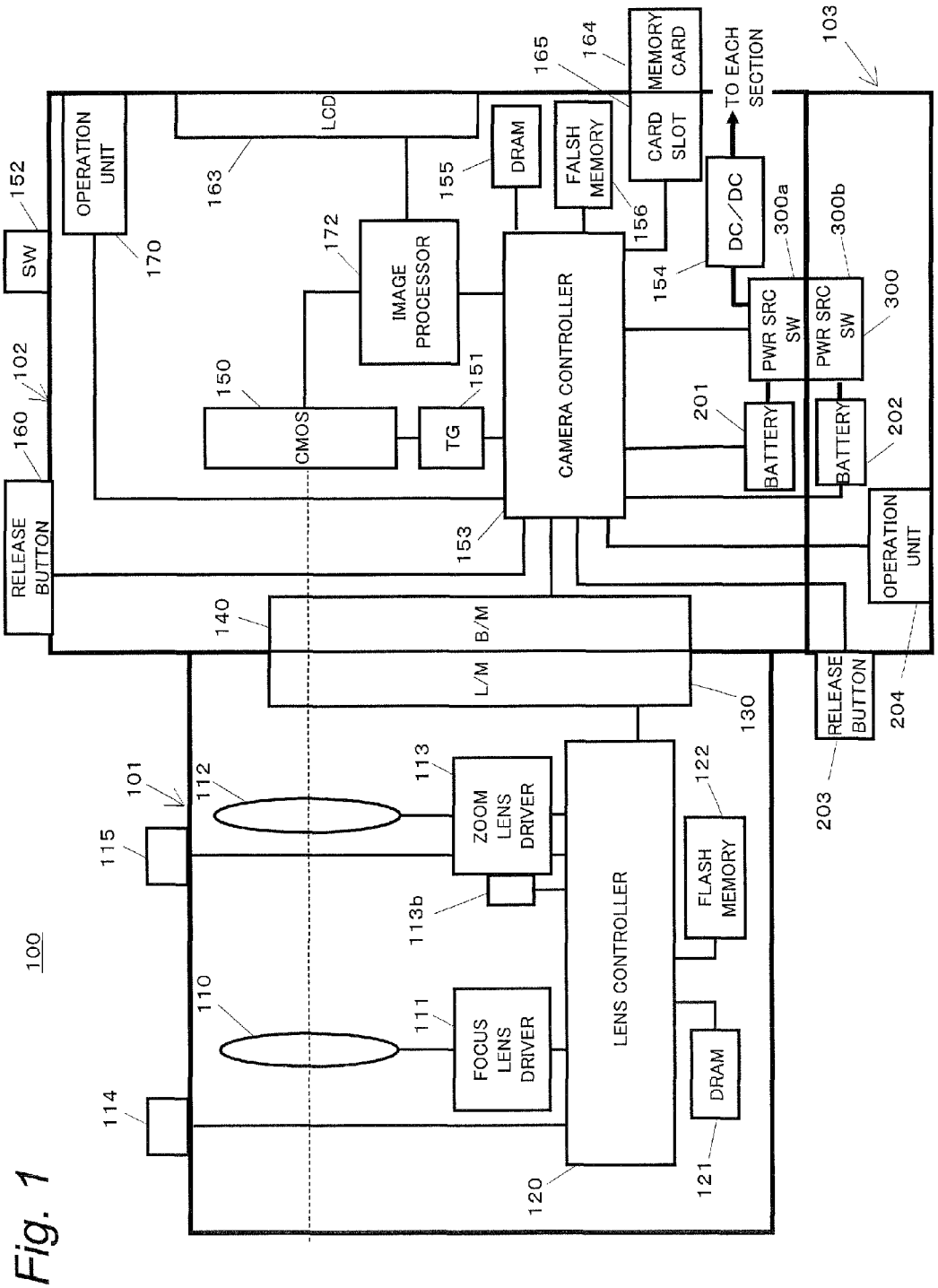
FIG. 1 is a block diagram of a digital camera of a first embodiment.

Embodiments will be described below in detail with reference to the drawings as required. However, unnecessarily detailed description may be omitted. For example, detailed description of already known matters and redundant description of substantially the same configuration may be omitted. All of such omissions are for facilitating understanding by those skilled in the art by preventing the following description from becoming unnecessarily redundant. The inventor(s) provide the attached drawings and the following description for those skilled in the art to fully understand the present disclosure and does not intend to limit the subject described in the claims by the attached drawings and the following description.

Embodiments will be described below in detail with reference to the drawings.

First Embodiment

A digital camera of a first embodiment will be described below with reference to the drawings.

1. Configuration

The configuration of the digital camera will be described below with reference to the drawing.

FIG. 1 is a block diagram illustrating a configuration of the digital camera according to the first embodiment. The digital camera 100 includes a camera body 102, an interchangeable lens 101 which can be mounted to the camera body 102, and a battery grip 103 which can be mounted to the camera body 102. The interchangeable lens 101 has a zoom lens 112 which is driven by a zoom lens driver 113. The camera body 102 can electrically drive the zoom lens 112 via a lens controller 120.

That is, the interchangeable lens 101 is an electromotive zoom lens. The camera body 102 has a power source switching circuit 300a. The battery grip 103 can be mounted with a battery 202 and has a power source switching circuit 300b. The power source switching circuit 300a and the power source switching circuit 300b composes a power source switching circuit 300. The camera body 102 can control the power source switching circuit 300 by a camera controller 153. That is, the camera body 102 can select whether to use a battery 201 or a battery 202.

1-1. Configuration of Camera Body

The camera body 102 has a CMOS image sensor 150, a liquid crystal display monitor 163, an image processor 172, a timing generator (TG) 151, a camera controller 153, a body mount 140, a release button 160, an operation unit 170, a battery 201, a power source switching circuit 300a, a DRAM 155, a flash memory 156, and a card slot 165.

The camera controller 153 controls the operation of the entire digital camera 100 by controlling each of components such as the CMOS image sensor 150, according to an instruction input from an operating member such as the release button 160 and the operation unit 170. The camera controller 153 sends a vertical synchronizing signal to the timing generator 151. In parallel to that process, the camera controller 153 generates an exposure synchronizing signal based on the vertical synchronizing signal. The camera controller 153 periodically and repeatedly sends the generated exposure synchronizing signal to the lens controller 120 via the body mount 140 and a lens mount 130. With the above described operation, the camera controller 153 can control the lenses such as a focus lens 110 in the interchangeable lens 101 in synchronous with the exposure. The camera controller 153 uses the DRAM 155 as a work memory in performing a control operation or an image processing operation. The camera controller 153 may be implemented by a hardwired electronic circuit or a microcomputer using a program. Alternatively, the camera controller 153 may be integrated into or separately provided from a semiconductor chip in which the image processor 172 and the DRAM 155 are formed.

The CMOS image sensor 150 is configured to include a light-receiving element, an AGC (gain control amplifier), and an AD converter. The light-receiving element converts optical signals collected by the interchangeable lens 101 into electric signals to generate image information. The AGC amplifies the electric signal output from the light-receiving element. The AD converter converts the electric signal output from the AGC into a digital signal. The CMOS image sensor 150 operates at a timing controlled by the timing generator 151. The operation of the CMOS image sensor 150 under the control of the timing generator 151 includes a capture operation of a still image, a capture operation of a through image, a data transfer operation, and an electronic shutter operation. A through image, which is primarily a moving image, is displayed on the liquid crystal display monitor 163 for a user to compose the still image to capture. The image information generated by the CMOS image sensor 150 is supplied to the image processor 172. Another image capturing device such as an NMOS image sensor or a CCD image sensor may be used in place of the CMOS image sensor 150.

The image processor 172 performs predetermined image processing on the image data which has been converted into the digital signal by the AD converter in the CMOS image sensor 150. For example, the predetermined image processing may include, but is not limited to, gamma correction process, white balance correction process, flaw correction process, YC conversion process, digital zoom process, compression process, and expansion process.

The liquid crystal display monitor 163 is a display unit installed on the rear of the camera body 102. The liquid crystal display monitor 163 displays an image indicated by the image information for display processed by the image processor 172. The liquid crystal display monitor 163 can selectively display the moving image and the still image. Besides, the liquid crystal display monitor 163 can display information including setting conditions and the like of the digital camera 100. Although the liquid crystal display monitor 163 is described as an example of the display unit in the present embodiment, the display unit is not limited to that. For example, an organic electroluminescence EL display may be used as the display unit.

The flash memory 156 functions as an internal memory for storing image information and the like. The flash memory 156 stores programs and parameters to be used by the camera controller 153 in performing the respective controls.

The card slot 165 is connection means for mounting the memory card 164 to the camera body 102. The card slot 165 can electrically and mechanically connect the memory card 164. The card slot 165 may have a function of controlling the memory card 164.

The memory card 164 is an external memory containing a storage element such as a flash memory. The memory card 164 can store data including image information processed by the camera controller 153. The memory card 164 can also output data including image information stored therein. The image data read out from the memory card 164 is processed by the camera controller 153 or the image processor 172 and displayed, for example, on the liquid crystal display monitor 163. Although the memory card 164 is described as an example of the external memory in the present embodiment, the external memory is not limited to that. For example, a recording medium such as an optical disk may be used as the external memory.

The body mount 140 can mechanically and electrically connect with the lens mount 130 (described later) of the interchangeable lens 101. The body mount 140 together with the lens mount 130 can achieve communication of data between the camera body 102 and the interchangeable lens 101. The body mount 140 sends the exposure synchronizing signal and other control signals which are received from the camera controller 153 to the lens controller 120 via the lens mount 130. The body mount 140 also sends the signals, which are received from the lens controller 120 via the lens mount 130, to the camera controller 153.

The battery 201 supplies power for driving the digital camera 100. The power supply 201 may be a dry battery or a rechargeable battery, for example. Instead of the battery 201, the power supply may be configured to supply power to the digital camera 100 input from outside through a power cord. The power of the digital camera 100 is turned on/off by the power switch 152. When the power of the digital camera 100 is turned on, the camera controller 153 supplies power to the respective components in the camera body 102. The camera controller 153 also supplies power to the interchangeable lens 101 through the body mount 140 and the lens mount 130. In the interchangeable lens 101, the lens controller 120 supplies power to the respective components of the interchangeable lens 101.

The power source switching circuit 300a composes a part of the power source switching circuit 300. The power source switching circuit 300 switches whether to supply power to the digital camera 100 from the battery 201 in the camera body 102 or from the battery 202 in the battery grip 103 (to be described later). The power source switching circuit 300 outputs power from the selected battery to a DC-DC converter 154. The power source switching circuit 300 is controlled by the camera controller 153.

The DC-DC converter 154 supplies power from the power source switching circuit 300 to the respective components (load sections) of the digital camera 100. The DC-DC converter 154 converts the voltage supplied from the battery into a voltage appropriate for the respective components when supplying power to the respective components.

The release button 160 receives an operation to instruct the digital camera 100 to perform image capturing or autofocus by the user. The release button 160 can be operated in two stages including a half-press stage and a full-press stage. In response to the user's half-press operation on the release button 160, the camera controller 153 performs the autofocus operation. In response to the user's full-press operation on the release button 160, the camera controller 153 starts to record the image data generated at the moment of the full-press operation into the memory card 164.

The operation unit 170 includes directional buttons which allow the user to direct up/down/right/left directional operations. When the interchangeable lens 101 having an electromotive zoom function is mounted to the camera body 102, the camera controller 153 assigns the functions of zoom operation buttons to the right and left buttons of the operation unit 170, respectively. For example, the camera controller 153 assigns the function of zoom operation changing toward the wide-angle end to the left button, and assigns the function of zoom operation changing toward the telephoto end to the right button. When the interchangeable lens 101 having the electromotive zoom function mounted to the camera body 102 has a zoom lever for the user to perform zoom operation, the camera controller 153 does not need to assign the functions of zoom operations to the operation unit 170.

1-2. Configuration of Interchangeable Lens

The interchangeable lens 101 has a focus lens 110, a focus lens driver 111, a focus ring 114, a zoom lens 112, a zoom lens driver 113, a zoom ring 115, a lens controller 120, a DRAM 121, a flash memory 122, and a lens mount 130. The interchangeable lens 101 may further include a camera shake correction lens in addition to the lenses illustrated in FIG. 1.

The lens controller 120 controls the operation of the entire interchangeable lens 101. The lens controller 120 may be implemented by a hardwired electronic circuit or a microcomputer using a program.

The DRAM 121 functions as a work memory used in control by the lens controller 120. The flash memory 122 stores programs, parameters, and lens data used in the control by the lens controller 120. Here, the lens data includes characteristic values specific to the interchangeable lens 101 such as, for example, name of the lens, lens ID, serial number, F number, and focal distance. The lens controller 120 sends the camera controller 153 the lens data, so that the camera controller 153 can perform the respective control operations according to the lens data, as described later.

The zoom lens 112 is a lens for changing the magnification of a subject image which is formed through an optical system of the interchangeable lens 101. The zoom lens 112 may be composed of any number of lenses or any number of lens groups.

The zoom lens driver 113 is a mechanical system for driving the zoom lens 112 along the optical axis of the optical system according to the operation made by the user on the zoom ring 115. The position of the zoom lens 112 is always detected by a zoom lens position detector 113b and sent to the lens controller 120.

The focus lens 110 is a lens for changing the focus state of a subject image incident through the optical system and is formed on the CMOS image sensor 150. The focus lens 110 may be composed of any number of lenses or any number of lens groups.

The focus ring 114 is installed on the outside surface of the interchangeable lens 101. When the focus ring 114 is operated by the user, information on amount of operation on the focus ring 114 is notified to the lens controller 120. Based on the notified information on amount of operation on the focus ring 114, the lens controller 120 causes the focus lens driver 111 to drive the focus lens 110. For that purpose, the lens controller 120 recognizes the position of the focus lens 110.

The focus lens driver 111 drives the focus lens 110 to move forward and backward along the optical axis of the optical system under the control of the lens controller 120. The focus lens driver 111 may be implemented by, for example, a stepping motor, a DC motor, an ultrasonic motor or the like.

1-3. Configuration of the Battery Grip

The battery grip 103 has the battery 202, the power source switching circuit 300b, the release button 203, and the operation unit 204.

The battery 202 supplies power for driving the digital camera 100. The battery 202 may be a dry battery or a rechargeable battery, for example. Instead of the battery 202, the power supply may be adapted to energize the digital camera 100 from outside through a power cord. The digital camera 100 is turned on/off with the power switch 152. When the digital camera 100 is turned on, the camera controller 153 supplies power to the respective components of the camera body 102. The camera controller 153 also supplies power to the interchangeable lens 101 through the body mount 140 and the lens mount 130. In the interchangeable lens 101, the lens controller 120 supplies power to the respective components of the interchangeable lens 101.

The power source switching circuit 300b forms apart of the power source switching circuit 300. The power source switching circuit 300 switches whether to supply power to the digital camera 100 from the battery 201 in the camera body 102 or the battery 202 in the battery grip 103 (to be described later). The power source switching circuit 300b is controlled by the camera controller 153.

The release button 203 receives an operation by the user for an instruction for image capturing or autofocus. The release button 203 can be operated in a two-stage operation including a half-press operation and a full-press operation. In response to the user's half-press operation on the release button 203, the camera controller 153 performs the autofocus operation. In response to the user's full-press operation on the release button 203, the camera controller 153 records the image data generated at the moment of the full-press operation into the memory card 164.

The operation unit 204 includes directional buttons which allow the user to direct up/down/right/left directional operations. When the interchangeable lens 101 with an electric zoom function is mounted to the camera body 102, the camera controller 153 assigns the functions of zoom operations to the right and left buttons of the operation unit 204 respectively. For example, the camera controller 153 assigns the function of a zoom operation for changing the zoom toward the wide-angle end to the left button, and assigns the function of a zoom operation for changing the zoom toward the telephoto end to the right button. When the interchangeable lens 101 with the electric zoom function mounted to the camera body 102 has a zoom lever for the user to perform zoom operation, the camera controller 153 does not need to assign the functions of zoom operation to the operation unit 204.

The battery 201 is an example of a first power source. The battery 202 is an example of a second power source. The power source switching circuit 300 is an example of the power source switching device. The digital camera 100 is an example of the electronic appliance.

1-4. Configuration of Power Source Switching Circuit

A detailed configuration of the power source switching circuit 300 will be described with reference to FIG. 2. The power source switching circuit 300 includes the power source switching circuit 300a provided in the camera body 102 and the power source switching circuit 300b provided in the battery grip 103.

The power source switching circuit 300 includes a P channel MOSFET 301 for connecting and disconnecting the battery 201 and a P channel MOSFET 302 for connecting and disconnecting the battery 202. The power source switching circuit 300 further includes a P channel MOSFET 303 for disconnecting a current flowing from the battery 202 into the battery 201 and a P channel MOSFET 304 for disconnecting a current flowing from the battery 201 into the battery 202. The power source switching circuit 300 further includes an NPN transistor 305 and an NPN transistor 306 for driving the FET 301 and an NPN transistor 307 and an NPN transistor 308 for driving the FET 302. The power source switching circuit 300 further includes an NPN transistor 309 for driving the FET 303 for disconnecting and an NPN transistor 310 for driving the FET 304 for disconnecting.

The source of the FET 301 is connected with the positive electrode of the battery 201. The drain of the FET 301 is connected with the drain of the FET 303. The gate of the FET 301 is connected with the collector of the transistor 305.

The source of the FET 302 is connected with the positive electrode of the battery 202. The drain of the FET 302 is connected with the drain of the FET 304. The gate of the FET 302 is connected with the collector of the transistor 307.

The source of the FET 303 is connected with the source of the transistor 304 and the DC-DC converter 154. The gate of the FET 303 is connected with the collector of the transistor 309. The gate of the FET 304 is connected with the collector of the transistor 310.

The base of the transistor 305 is connected with the collector of the transistor 306. The emitter of the transistor 305 is grounded.

The base of the transistor 306 is connected with a terminal of a control signal 1 of the camera controller 153. The emitter of the transistor 306 is grounded.

The base of the transistor 307 is connected with the collector of the transistor 308. The emitter of the transistor 307 is grounded.

The base of the transistor 308 is connected with a terminal of a control signal 2 of the camera controller 153. The emitter of the transistor 308 is grounded.

The base of the transistor 309 is connected with the output of an AND circuit 313. The emitter of the transistor 309 is grounded.

The base of the transistor 310 is connected with the output of an AND circuit 314. The emitter of the transistor 310 is grounded.

Here, the FET 301, the FET 302, the FET 303, and the FET 304 include parasitic diodes, respectively. In FIG. 2, the parasitic diodes are illustrated for convenience. The parasitic diode allows a current to flow from the drain to the source of each FET.

Note that the part of the FET 301, which is conceptually other than the parasitic diode and performs the switching operation, is an example of a first switch circuit. The part of the FET 302, which is conceptually other than the parasitic diode and performs the switching operation, is an example of a second switch circuit. The part of the FET 303 which is conceptually other than the parasitic diode and performs the switching operation is an example of a third switch circuit. The part of the FET 304 which is conceptually other than the parasitic diode and performs the switching operation is an example of a fourth switch circuit. The parasitic diode of the FET 303 is an example of a first diode. The parasitic diode of the FET 304 is an example of a second diode.

The power source switching circuit 300 has the AND circuit 313 for generating a control signal for the FET 309 and the AND circuit 314 for generating a control signal for the FET 310. The AND circuit 313 inputs the control signal 3 and the control signal 2 from the camera controller 153, and has an output which is connected with the base of the transistor 309. The AND circuit 314 inputs the control signal 4 and the control signal 1 from the camera controller 153, and has an output which is connected with the base of the transistor 310. The AND circuits 313 and 314 may be composed of a transistor or the like.

The control signal 1 is a signal for controlling ON (conduction)/OFF (out of conduction) of the FET 301. When the control signal 1 is Low (Lo), it turns on the FET 301 to bring the FET 301 into conduction. When the control signal 1 is High (Hi), it turns off the FET 301 to bring the FET 301 out of conduction. The control signal 2 is a signal for controlling ON (conduction)/OFF (out of conduction) of the FET 302. When the control signal 2 is Low, it turns on the FET 302 to bring the FET 302 into conduction. When the control signal 2 is High, it turns off the FET 302 to bring the FET 302 out of conduction.

TABLE 1

| Control Signal | Logic | Operation |
| --- | --- | --- |
| Control Signal 1 | Low | to turn FET 301 On (conduction) |
|  | High | to turn FET 301 off (out of conduction) |
| Control Signal 2 | Low | to turn FET 302 on (conduction) |
|  | High | to turn FET 302 off (out of conduction) |

The control signal 3 is a signal for forcing the FET 303 for disconnection, to be turned off (out of conduction) (or in one-direction conducting state). Specifically, the control signal 3 of Low turns off the FET 303 for disconnection to be out of conduction. The control signal 4 is a signal for forcing the FET 304 for disconnection to be out of conduction (to be in a one-direction conducting state). Specifically, the control signal 4 of Low turns off the FET 304 for disconnection to be out of conduction.

The FET 301 is controlled to be ON (in conduction) when the control signal 1 output from the camera controller 153 of the camera body 102 is Lo, while when the control signal 1 is Hi, the FET 301 is controlled to be OFF (out of conduction) (see Table 1). Specifically, when the control signal 1 is Lo, the transistor 306 is turned off, so that Hi is input to the base of the transistor 305. As a result, the transistor 305 is turned on so that Lo is input to the gate of the FET 301. Consequently, the FET 301 is turned on to be in conduction. On the other hand, when the control signal 1 is Hi, the transistor 306 is turned on, so that Lo is input to the base of the transistor 305. As a result, the transistor 305 is turned on, so that Hi is input to the gate of the FET 301. Consequently, the FET 301 is turned off to be out of conduction.

The FET 302 is controlled to be ON (in conduction) when the control signal 2 output from the camera controller 153 of the camera body 102 is Lo, while when the control signal 2 is Hi, the FET 302 is controlled to be OFF (out of conduction)

(see Table 1). Specifically, when the control signal 2 is Lo, the transistor 308 is turned off, so that Hi is input to the base of the transistor 307. As a result, the transistor 307 is turned on so that Lo is input to the gate of the FET 302. Consequently, the FET 302 is turned on. On the other hand, when the control signal 2 is Hi, the transistor 308 is turned on, so that Lo is input to the base of the transistor 307. As a result, the transistor 307 is turned off so that Hi is input to the gate of the FET 302. Consequently, the FET 302 is turned off.

The FET 303 is controlled to be ON (in conduction) when both the control signal 3 and the control signal 2 output from the camera controller 153 of the camera body 102 are Hi. When at least one of the control signal 3 and the control signal 2 is Lo, the FET 303 is controlled to be in one direction conducting state (diode state) which is enabled by the parasitic diode. Specifically, when both of the control signal 3 and the control signal 2 are Hi, the output from the AND circuit 313 becomes Hi and the Hi is input to the transistor 309. As a result, the transistor 309 is turned on and Lo is input to the gate of the FET 303. Consequently, the FET 303 is turned on. On the other hand, when at least one of the control signal 3 and the control signal 2 is Lo, the output from the AND circuit 313 becomes Lo and the Lo is input to the transistor 309. As a result, the transistor 309 is turned off and Hi is input to the gate of the FET 303. Consequently, the FET 303 is turned off to be out of conduction.

The FET 304 is controlled to be ON (in conduction) when both of the control signal 4 and the control signal 1 output from the camera controller 153 of the camera body 102 are Hi. When at least one of the control signal 4 and the control signal 1 is Lo, the FET 304 is controlled to be OFF (out of conduction). When the FET 304 is turned off, it becomes in the one direction conducting state (diode state) by the parasitic diode. Specifically, when both of the control signal 4 and the control signal 1 are Hi, the output from the AND circuit 314 becomes Hi and the Hi is input to the transistor 310. As a result, the transistor 310 is turned on so that Lo is input to the gate of the FET 304. Consequently, the FET 304 is turned on to be in conduction. On the other hand, when at least one of the control signal 4 and the control signal 1 is Lo, the output from the AND circuit 314 becomes Lo and the Lo is input to the transistor 310. As a result, the transistor 310 is turned off and Hi is input to the gate of the FET 304. Consequently, the FET 304 is turned off to be out of conduction It is assumed that any of the control signal 1, the control signal 2, the control signal 3, and the control signal 4 output from the camera controller 153 of the camera body 102 outputs Lo when the power switch 152 of the digital camera 100 is off. Therefore, when the battery 201 and the battery 202 are mounted to the digital camera 100 and the power switch 152 is off, the FETs 301 and 302 are on (in conduction) and the FET 303 and the FET 304 are in the one direction conducting state. In that case, power from the battery 201 and the battery 202 is supplied to the DC-DC converter 154. However, when the power switch 152 is off, power is not supplied from the DC-DC converter 154 to the respective components. Because of the one direction conducting state of the FET 303 and the FET 304, the battery 201 and the battery 202 never short-circuit.

2. Operation of Power Source Switching Circuit

The operation of the entire power source switching circuit 300 of the digital camera 100 will be described below with reference to FIG. 2.

2-1. Operation in the Normal State

As the operation in the normal state of the digital camera 100, the operation performed upon power-on will be described first.

When the power switch 152 of the digital camera 100 is turned on by the user, power supply from the battery 201 and the battery 202 cause the camera controller 153 to start activation and the digital camera 100 starts up. After the camera controller 153 starts up, the camera controller 153 checks the remaining voltage of the battery 201 with a voltage monitor 1 terminal. Similarly, the camera controller 153 checks the remaining voltage of the battery 202 with a voltage monitor 2 terminal. The camera controller 153 compares the remaining voltage of the battery 201 with the remaining voltage of the battery 202 and performs a power control so that the battery with the higher remaining voltage is used first.

Figure 3:
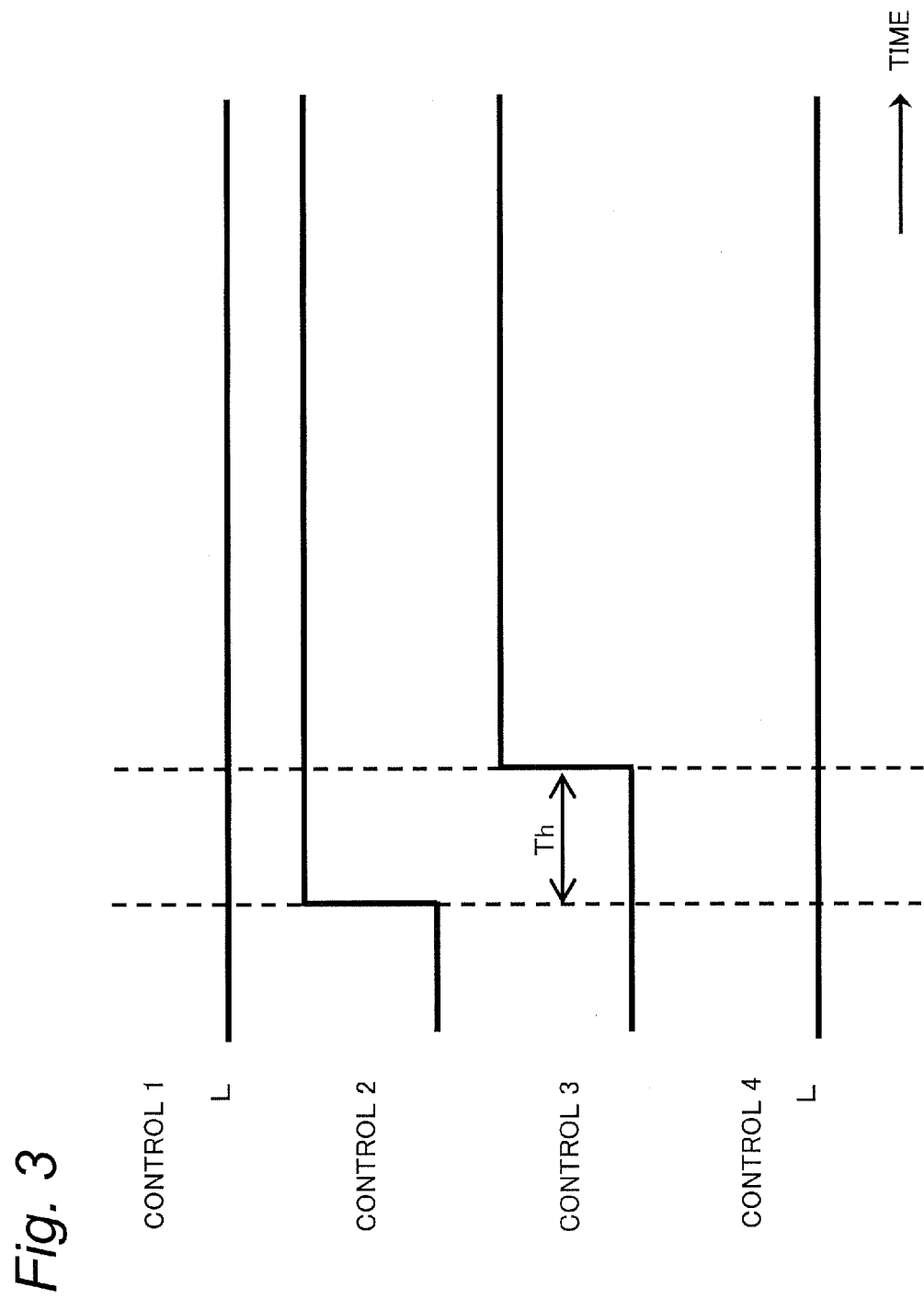
FIG. 3 is a timing chart of control signals output from a camera controller (in the case where power is supplied from a battery in a camera body)

When the remaining voltage of the battery 201 is higher than the remaining voltage of the battery 202, the camera controller 153 performs the power control so that power is supplied from the battery 201 and power is not supplied from the battery 202. Specifically, as illustrated in FIG. 3, the camera controller 153 controls the control signal 2 to be Hi. Then, after a predetermined waiting time (Th) passes, which is enough for the FET 302 to transit from the conduction state (on state) to the out-of conduction state (off state), the camera controller 153 controls the control signal 3 to be Hi. On that occasion, the control signal 1 and the control signal 4 remain Lo. Therefore, the FET 301 and the FET 303 are in the conduction state (on state), the FET 302 is in the out-of conduction state (off state), and the FET 304 is in the one direction conducting state.

Figure 4:
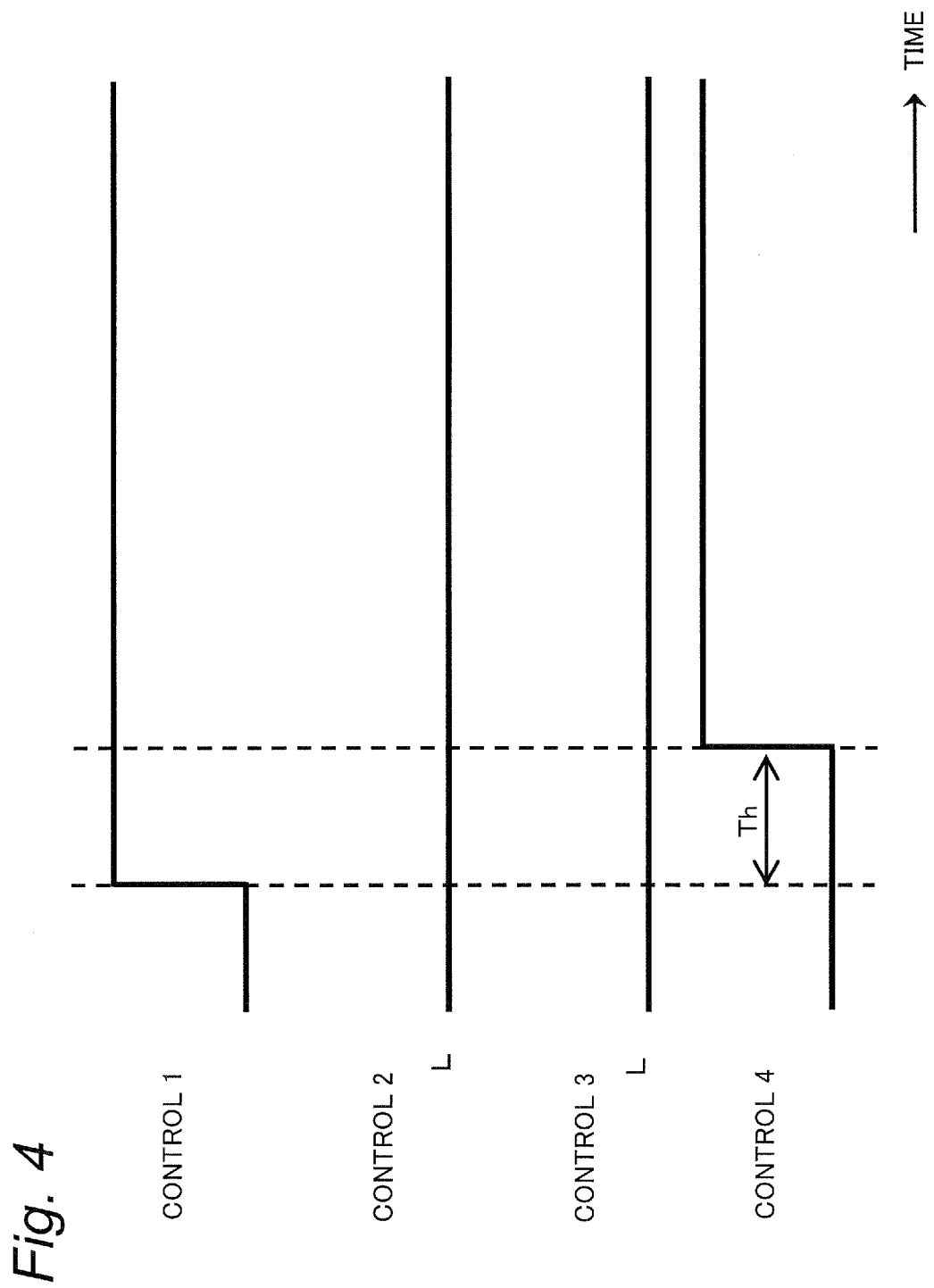
FIG. 4 is a timing chart of control signals output from the camera controller (in the case where power is supplied from a battery in a battery grip)

On the other hand, when the remaining voltage of the battery 202 is higher than the remaining voltage of the battery 201, the camera controller 153 performs the power control so that power is supplied from the battery 202 and power is not supplied from the battery 201. Specifically, as illustrated in FIG. 4, the camera controller 153 controls the control signal 1 to be Hi. Then, after the predetermined waiting time (Th) passes, which is enough for the FET 301 to transit from conduction state to out-of conduction state, the camera controller 153 controls the control signal 4 to be Hi. On that occasion, the control signal 2 and the control signal 3 remain Lo. Therefore, the FET 302 and the FET 304 are in the conduction sate, the FET 301 is in the out-of conduction state, and the FET 303 is in the one direction conducting state.

Once the digital camera 100 starts up, the user is allowed to freely set switching between the battery 201 and the battery 202 to be used by using a menu screen or the like of the digital camera 100. For example, when the remaining voltage of the battery 201 is higher than the remaining voltage of the battery 202 at the moment of starting up the digital camera 100, it is decided to use the battery 201 according to the above described control. Thereafter, in the case where the user makes setting of the battery to use, the power source switching circuit 300 selects appropriately either one of the battery 201 and the battery 202 to use, according to the setting.

Figure 5:
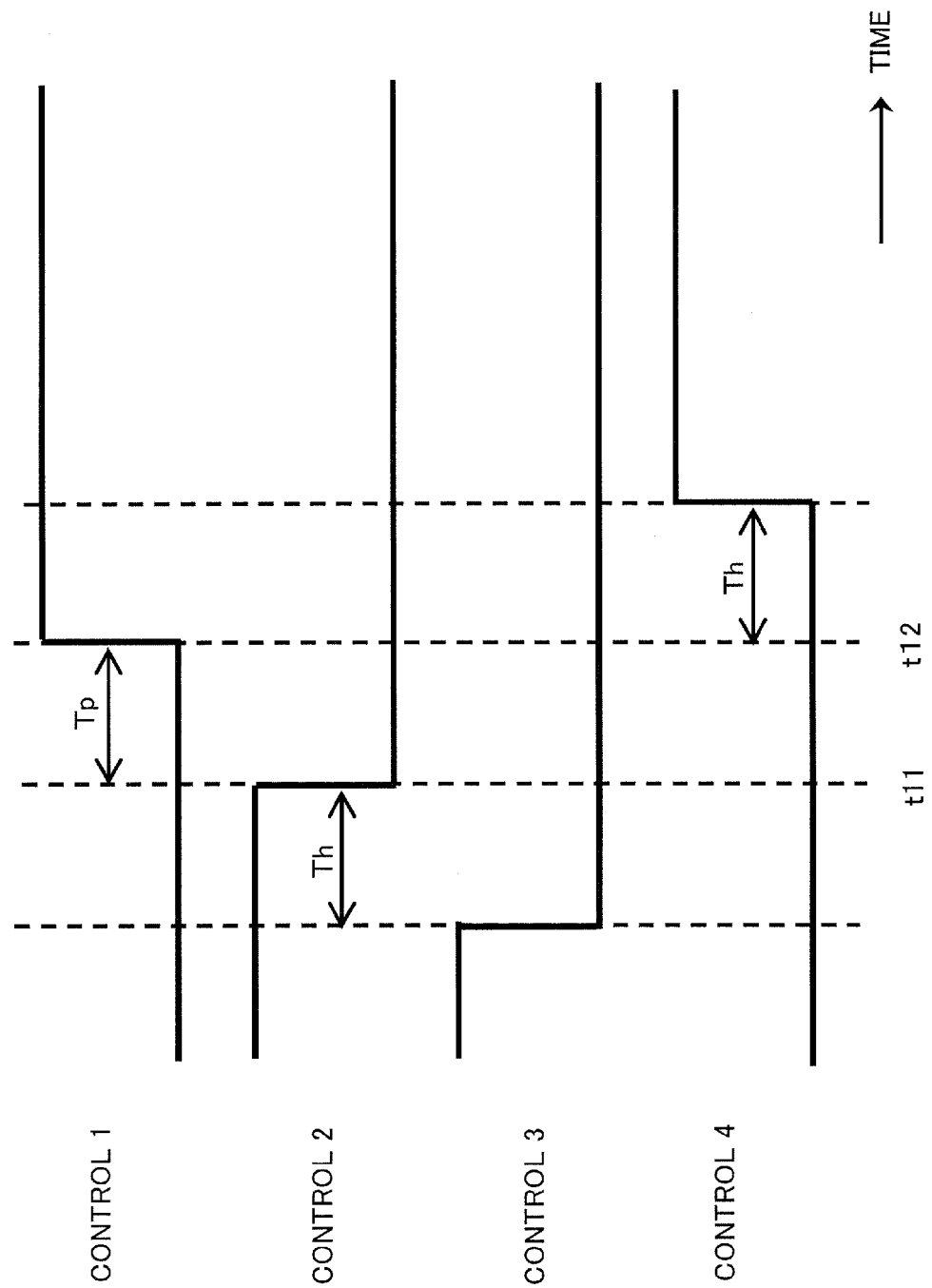
FIG. 5 is a timing chart of control signals output from the camera controller (in the case of switching the battery in the camera body to the battery in the battery grip)

For example, in the case where the battery 201 is set as a battery to use at the start-up of the digital camera 100 and, thereafter, the user sets the battery 202 as a battery to use, the camera controller 153 performs switching to the battery 202. Specifically, as illustrated in FIG. 5, the camera controller 153 controls the control signal 3 to be Lo. After the predetermined waiting time (Th), the camera controller 153 controls the control signal 2 to be Lo. At that time, the FETs 301 and 302 are in the conduction sate (on state) and the FET 303 and the FET 304 are in the one direction conducting state. As a result, power is supplied from both of the battery 201 and the battery 202. Therefore, the power of the digital camera 100 is never turned off during the switching process of the batteries. Since the FET 303 and the FET 304 are in the one direction conducting state, the battery 201 and the battery 202 are never short-circuited. Thereafter, the camera controller 153 controls the control signal 1 to be Hi. After the predetermined waiting time (Th), the camera controller 153 controls the control signal 4 to be Hi. At that time, the FET 301 is in the out-of conduction state (off state) and the FET 303 is in the one direction conducting state. The FET 302 and the FET 304 are in the conduction state (on state). As a result, power is supplied from the battery 202 and the power supply from the battery 201 stops. In that manner, the battery 201 is switched to the battery 202. Further, in the process of switching the battery 201 to the battery 202, a time period (Tp) (time t11 to t12) in which both of the battery 201 and the battery 202 supply power is provided. Therefore, the digital camera 100 is never turned off during the switching process of the batteries. Since the FET 303 and the FET 304 are in the one direction conducting state during the time period Tp, a short-circuit never occurs between the battery 201 and the battery 202.

Figure 6:
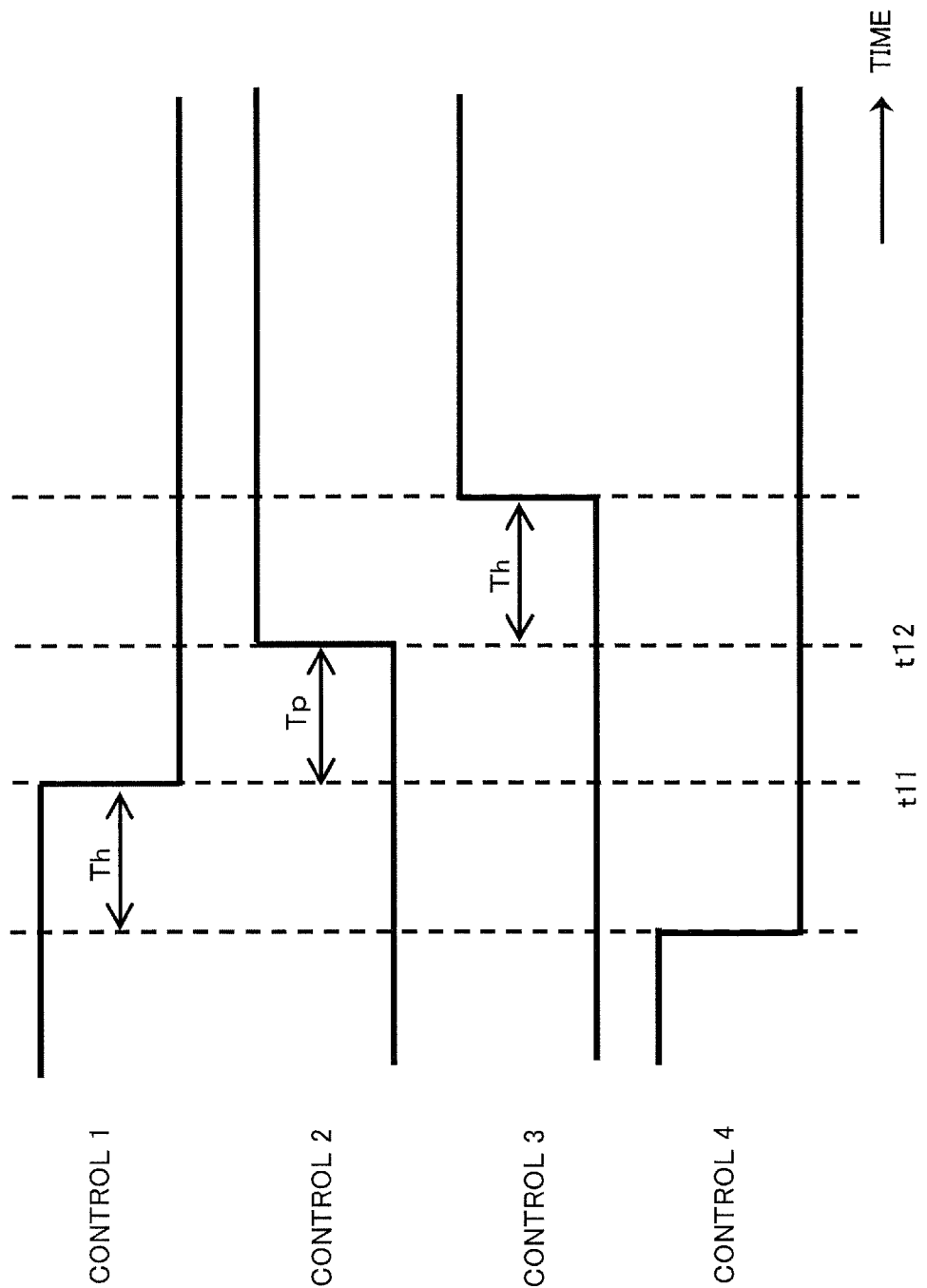
FIG. 6 is a timing chart of control signals output from the camera controller (in the case of switching the battery in the battery grip to the battery in the camera body).

In the case where the user sets the battery 201 as the battery to use while the battery 202 is currently set as the battery to use, the camera controller 153 controls the control signal 4 to be Lo, and after the predetermined waiting time (Th), the camera controller 153 controls the control signal 1 to be Lo, as illustrated in FIG. 6. At that time, the FETs 301 and 302 are in the conduction sate (on state) and the FET 303 and the FET 304 are in the one direction conduction state, so that power is supplied from both of the battery 201 and the battery 202. Thereafter, the camera controller 153 controls the control signal 2 to be Hi, and after the predetermined waiting time (Th), the camera controller 153 controls the control signal 3 to be Hi. At that time, the FET 302 is in the out-of conduction state (off state) and the FET 304 is in the one direction conducting state. The FET 301 and the FET 303 are in the conduction state. As a result, power is supplied from the battery 201 and the power supply from the battery 202 stops. In that manner, the battery 202 is switched to the battery 201. Further, in the process of switching the battery 202 to the battery 201, the time period (Tp) (time t11 to t12) in which both of the battery 201 and the battery 202 supply power is provided. Therefore, the power of the digital camera 100 is never turned off during the switching process of the batteries. Since the FET 303 and the FET 304 are in the one direction conducting state during the time period Tp, the battery 201 and the battery 202 are never short-circuited.

2-2. Operation in an Abnormal State

As the operation in an abnormal state of the digital camera 100, the operation in the case where the camera controller 153 runs away out of control and, accordingly, cannot output the normal control signal will be described.

Problems of a conventional power source switching circuit will be described first. In a situation of using a typical power source switching circuit, there may be a problem of short-circuit of the battery 201 and the battery 202. For example, it is assumed that a power source switching circuit which has the same circuit configuration as that illustrated in FIG. 2 except for the AND circuit 313 and the AND circuit 314 and which has the FET 303 which is turned on (in conduction) when the control signal 3 is Hi and the FET 304 which is turned on (in conduction) when the control signal 4 is Hi. In a power source switching circuit having such a configuration, when the camera controller 153 runs away out of control and, accordingly, cannot output the normal control signal the state may occur, where the battery 201 and the battery 202 short-circuit. That will be described in detail below.

For example, when the camera controller 153 runs away out of control and causes the control signal 1, the control signal 2, and the control signal 3 to be Lo and causes the control signal 4 to be Hi, the FET 301, the FET 302, and the FET 304 are in the conduction state, and the FET 303 is in the one direction conducting state. As a result, the battery 201 and the battery 202 are short-circuited and a charging path is formed from the battery 201 to the battery 202.

When the camera controller 153 causes the control signal 1, the control signal 2, and the control signal 4 to be Lo and causes the control signal 3 to be Hi, the FET 301, the FET 302, and the FET 303 are in the conduction state and the FET 304 is in the one direction conducting state. As a result, the battery 201 and the battery 202 are short-circuited and a charging path is formed from the battery 202 to the battery 201.

When the camera controller 153 causes the control signal 1 and the control signal 2 to be Lo and causes the control signal 3 and the control signal 4 to be Hi, the FET 301, the FET 302, the FET 303 and the FET 304 are brought into conduction (turned on) so that the battery 201 and the battery 202 are short-circuited. As a result, a charging path is formed from the battery 201 to the battery 202 or from the battery 202 to the battery 201.

On the other hand, in the power source switching circuit 300 of the present embodiment, the AND circuit 313 and the AND circuit 314 prevent the above described state. The FET 303 is controlled to be in conduction (turned on) when the control signal 3 is Hi and the control signal 2 is Hi output from the camera controller 153. The FET 303 is controlled to be in the one direction conducting state when at least one of the control signal 3 and the control signal 2 is Lo. The control signal 2 is a control signal for the FET 302, and the control signal 2 of Hi causes the FET 302 to be out of conduction (turned off). Therefore, the power source switching circuit 300 of the present embodiment is configured to not turn on the FET 303 (not bring the FET 303 in conduction) until the FET 302 is turned off (brought out of conduction) by the AND circuit 313, so that a charging path is not formed from the battery 202 to the battery 201. Similarly, the FET 304 is controlled to be turned on (in conduction) when the control signal 4 and the control signal 1 output from the camera controller 153 are Hi. The FET 304 is controlled to be in the one direction conducting state when at least one of the control signal 4 and the control signal 1 is Lo. The control signal 1 is a control signal for the FET 301, and the control signal 1 of Hi causes the FET 301 to be turned off (out of conduction). That is, the power source switching circuit 300 of the present embodiment is configured to not allow the FET 304 to be turned on (in conduction) until the FET 301 is turned off by the AND circuit 314, so that a charging path from the battery 201 to the battery 202 is not formed.

As such, according to the present embodiment, even in the case where the normal control signal cannot be output due to a runaway or the like of the camera controller 153 when either of the battery 201 and the battery 202 is used, the power source switching circuit 300 can prevent short-circuit from occurring between the battery 201 and the battery 202, thereby improving safety of the digital camera 100.

3. Summary

The digital camera 100 of the present embodiment has the power source switching circuit 300. The power source switching circuit 300 is a power source switching device which switches between the battery 201 and the battery 202 for the power source for supplying a driving voltage to the respective components (load section) of the digital camera 100. The power source switching circuit 300 has the FET 301 (the first switch circuit) which is provided between the battery 201 and the load section; the FET 302 (the second switch circuit) which is provided between the battery 202 and the load section; the FET 303 (the third switch circuit) which is provided between the battery 201 and the load section in series with the FET 301; the FET 304 (the fourth switch circuit) which is provided between the battery 202 and the load section in series with the FET 302; the diode (the parasitic diode of the FET 303) which is provided in parallel with the FET 303 for allowing a current to flow from the battery 201 to the load section while preventing a current from flowing into the battery 201; the diode (the parasitic diode of the FET 304) which is provided in parallel with the FET 304 for allowing a current to flow from the battery 202 to the load section while preventing a current from flowing into the battery 202; and the AND circuits 313 and 314 which control the FETs 303 and 304 (the third switch circuit and the fourth switch circuit) to prevent a situation from occurring where at least one of the FET 303 (the third switch circuit) and the FET 304 (the fourth switch circuit) is turned on while both of the FET 301 (the first switch circuit) and the FET 302 (the second switch circuit) are in an on state.

With the above described configuration, even when the normal control signal cannot be output due to a runaway or the like of the camera controller 153, the power source switching circuit 300 can prevent short-circuit from occurring between the battery 201 and the battery 202, improving safety of the digital camera 100.

Other Embodiments

As described above, the first embodiment has been discussed as an example of the technology disclosed in the present application. However, the technology in the present disclosure is not limited to that embodiment and may also be applied to embodiments which undergone modification, substitution, addition, omission or the like as required. Also, the respective constituent elements described in the first embodiment may be combined to form a new embodiment. Then, other embodiments will be exemplified below. The additional embodiments described below are non-exhaustive and other embodiments and variations are possible.

In the above described embodiment, the power source switching circuit 300*a* is provided in the camera body 102 and the power source switching circuit 300*b* is provided in the battery grip 103. They are configured to form the power source switching circuit 300 when the battery grip 103 is mounted to the camera body 102. However, the power source switching circuit 300 may be configured in either one of the camera body 102 and the battery grip 103 instead of being divided. Further, the battery 201, the battery 202, and the power source circuit 300 may be contained in either of the camera body 102 and the battery grip 103 (i.e., in a single electronic appliance).

Although the parasitic diodes of the FETs 303, 304 are used as a diode for blocking a current flowing in a backward direction in the above described embodiment, the parasitic diodes may not be used. For example, diode devices separate from the FETs 303 and 304 may be connected in parallel with the FETs 303 and 304, respectively.

Although the switch circuit and the diode connected in parallel with the switch circuit are configured by the FET 303 and the FET 304 in the above described embodiment, the switch circuit and the diode connected thereto may be configured by a relay and a diode connected in parallel with the relay.

Figure 2:
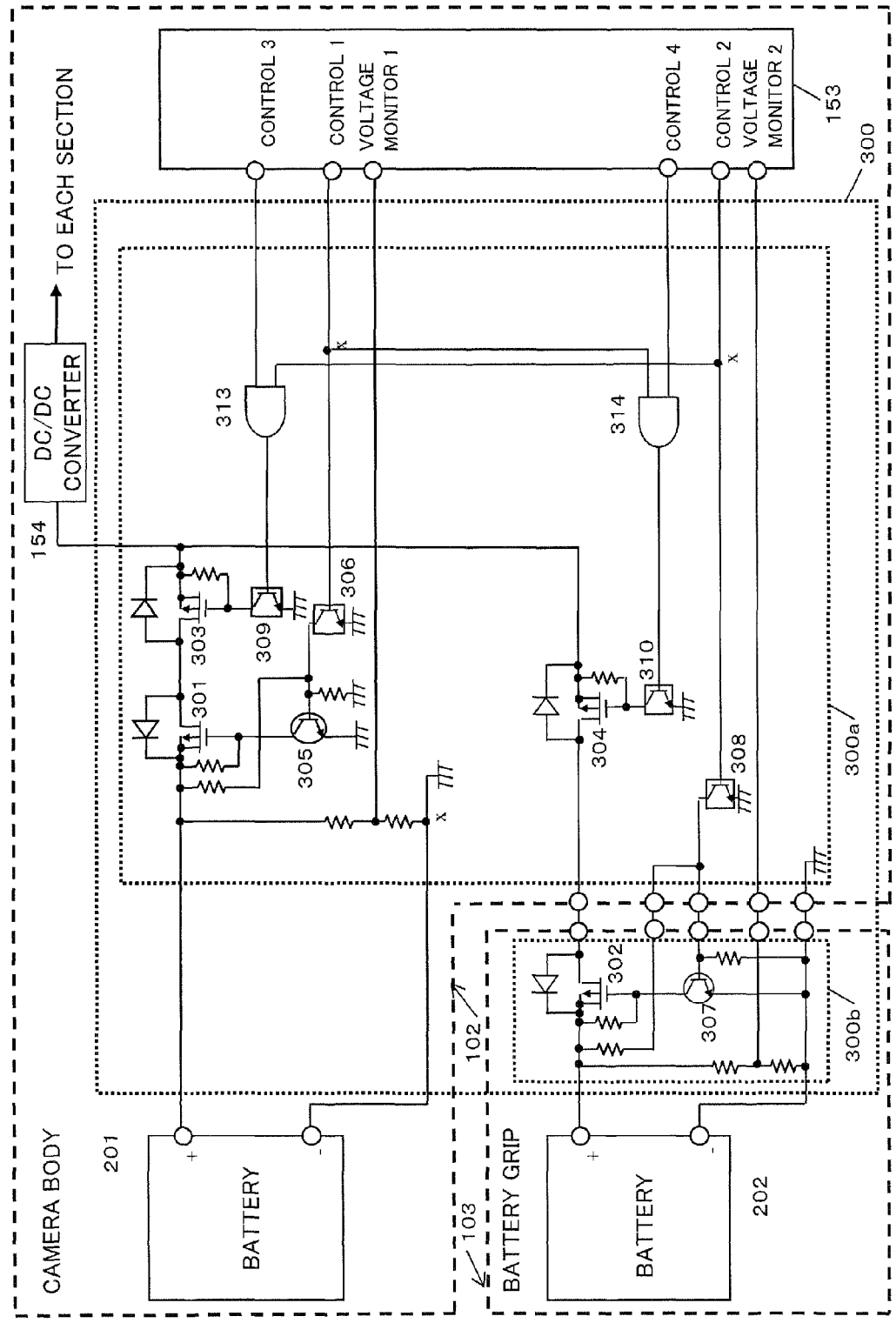
FIG. 2 is a block diagram of a power source switching circuit of the digital camera.

Although the example using the AND circuit as illustrated in FIG. 2 is given as an example of the logic circuit in the above described embodiment, specific circuitry of the logic circuit is not limited to the configuration illustrated in FIG. 2. That is, the logic circuit may be any circuitry as far as it prevents a situation where at least one of the FET 303 and the FET 304 is turned on while both of the FET 301 and the FET 302 are on.

Although the predetermined waiting time (Th) is set as the same value in the examples of FIG. 4 to FIG. 6 in the above described embodiment, the predetermined waiting time (Th) is not limited to that. The respective predetermined waiting time may be decided as required.

The idea of the present disclosure is applicable not only to digital cameras but also to various electronic appliances which can connect a plurality of batteries such as, for example, movie cameras, portable phones with camera function, and personal computers.

The embodiment has been described above as examples of the technology of the present disclosure. For the purposes of describing the embodiment, the accompanying drawings and the detailed description have been provided.

Therefore, the constituent elements shown or described in the accompanying drawings and the detailed description may include not only the constituent element necessary to solve the problem but also the constituent element unnecessary to solve the problem in order to exemplify the technology. Accordingly, it should not be instantly understood that these unnecessary constituent elements are necessary since these unnecessary constituent elements are shown or described in the accompanying drawings and the detailed description.

Since the above described embodiments are for exemplifying the technology in the present disclosure, the embodiments may be subject to various kinds of modification, substitution, addition, omission, or the like without departing from the scope of the claims and their equivalents.

INDUSTRIAL APPLICABILITY

The present disclosure is applicable to electronic appliances which can connect a plurality of batteries such as digital cameras, movie cameras, and portable phones with a camera function.

What is claimed is:

1. A power source switching device which switches between a first power source and a second power source as a power source for supplying a driving voltage to a load section, the power source switching device comprising:
 a first switch circuit provided between the first power source and the load section;
 a second switch circuit provided between the second power source and the load section;
 a third switch circuit provided between the first power source and the load section in series with the first switch circuit;
 a fourth switch circuit provided between the second power source and the load section in series with the second switch circuit;
 a first diode provided in parallel with the third switch circuit, the first diode operable to allow a current to flow from the first power source to the load section while preventing a current to flow from the second power source to the first power source;
 a second diode provided in parallel with the fourth switch circuit, the second diode operable to allow a current to flow from the second power source to the load section while preventing a current to flow from the first power source to the second power source;
 a logic circuit operable to control the third switch circuit and the fourth switch circuit to prevent at least one of the third switch circuit and the fourth switch circuit from turning on while both of the first switch circuit and the second switch circuit are in an on state; and a control circuit operable to control the first switch circuit, the second switch circuit, and the logic circuit.

2. The power source switching device according to claim 1, wherein when the control circuit outputs a signal for turning on both of the first switch circuit and the second switch circuit, the logic circuit outputs a signal for turning off both of the third switch circuit and the fourth switch circuit.

3. The power source switching device according to claim 1, wherein when changing the first switch circuit from the off state to the on state, the logic circuit turns off the fourth switch circuit before turning on the first switch circuit, and when changing the second switch circuit from the off state to the on state, the logic circuit turns off the third switch circuit before turning on the second switch circuit.

4. The power source switching device according to claim 1, wherein the third switch circuit includes a first FET, the first diode includes a parasitic diode of the first FET, the fourth switch circuit includes a second FET, and the second diode includes a parasitic diode of the second FET.

5. An electronic appliance comprising the power source switching device according to claim 1.

6. A camera body which can be mounted with an interchangeable lens and includes a load section which is supplied power from at least one of a first power source and a second power source, the camera body comprising:

a first switch circuit provided between the first power source and the load section;

a second switch circuit provided between the second power source and the load section;

a third switch circuit provided between the first power source and the load section in series with the first switch circuit;

a fourth switch circuit provided between the second power source and the load section in series with the second switch circuit;

a first diode provided in parallel with the third switch circuit, the first diode operable to allow a current to flow from the first power source to the load section while preventing a current to flow from the second power source to the first power source;

a second diode that is provided in parallel with the fourth switch circuit, the second diode operable to allow a current to flow from the second power source to the load section while preventing a current to flow from the first power source to the second power source;

a logic circuit operable to control the third switch circuit and the fourth switch circuit to prevent at least one of the third switch circuit and the fourth switch circuit from turning on while both of the first switch circuit and the second switch circuit are in an on state; and a control circuit operable to control the first switch circuit, the second switch circuit, and the logic circuit.

7. The camera body according to claim 6, wherein when the control circuit outputs a signal for turning on both of the first switch circuit and the second switch circuit, the logic circuit outputs a signal for turning off both of the third switch circuit and the fourth switch circuit.

8. The camera body according to claim 6, wherein the first power source is stored in the camera body and the second power source is provided outside the camera body.

9. The power source switching device according to claim 2, wherein when changing the first switch circuit from the off state to the on state, the logic circuit turns off the fourth switch circuit before turning on the first switch circuit, and when changing the second switch circuit from the off state to the on state, the logic circuit turns off the third switch circuit before turning on the second switch circuit.

10. The camera body according to claim 8, wherein the second power source is provided in a battery grip which can be mounted to the camera body.

11. The camera body according to claim 8, wherein the second power source supplies power to the load section via a power cord connected to the camera body.

* * * * *